United States Patent
Bryant et al.

(10) Patent No.: US 8,393,371 B2
(45) Date of Patent: Mar. 12, 2013

(54) SYSTEM FOR PROCESSING COMPOSITE MATERIALS

(75) Inventors: William Joseph Bryant, Wichita, KS (US); Christopher J. Morrow, Wichita, KS (US); Kenneth I. Fried, Wichita, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 64 days.

(21) Appl. No.: 12/754,982

(22) Filed: Apr. 6, 2010

(65) Prior Publication Data
US 2011/0240214 A1  Oct. 6, 2011

(51) Int. Cl.
*B32B 37/10* (2006.01)

(52) U.S. Cl. ........ 156/381; 156/382; 425/390; 425/394; 425/389; 425/405.1; 425/500; 425/503; 425/504; 425/518; 425/520

(58) Field of Classification Search ........... 156/381, 156/382, 285; 425/500, 503, 504, 518, 520, 425/390, 394, 389, 405.1; 264/511, 570–572
See application file for complete search history.

(56) References Cited

U.S. PATENT DOCUMENTS

| | | | |
|---|---|---|---|
| 5,648,109 A * | 7/1997 | Gutowski et al. | 425/504 |
| 2008/0314497 A1 * | 12/2008 | Pettersen et al. | 156/62.2 |

* cited by examiner

Primary Examiner — Christopher Schatz
(74) Attorney, Agent, or Firm — Hovey Williams LLP

(57) ABSTRACT

A system for processing a composite material may comprise a chamber, a mandrel, an upper ramp, and an upper diaphragm. The chamber generally provides structural support while a vacuum is applied to the system and may have a six-sided generally rectangular box shape. The mandrel generally provides support for the composite material, and may be located within the chamber. The upper ramp generally provides a path for the upper diaphragm to follow under vacuum, and may be located adjacent to the mandrel and tilted at approximately 45 degrees downward thereto. The upper diaphragm may be placed over an opening along one side of the chamber. During processing, a vacuum may be applied to chamber and the upper diaphragm may be pulled inward through the opening to press the composite material against the mandrel.

17 Claims, 9 Drawing Sheets

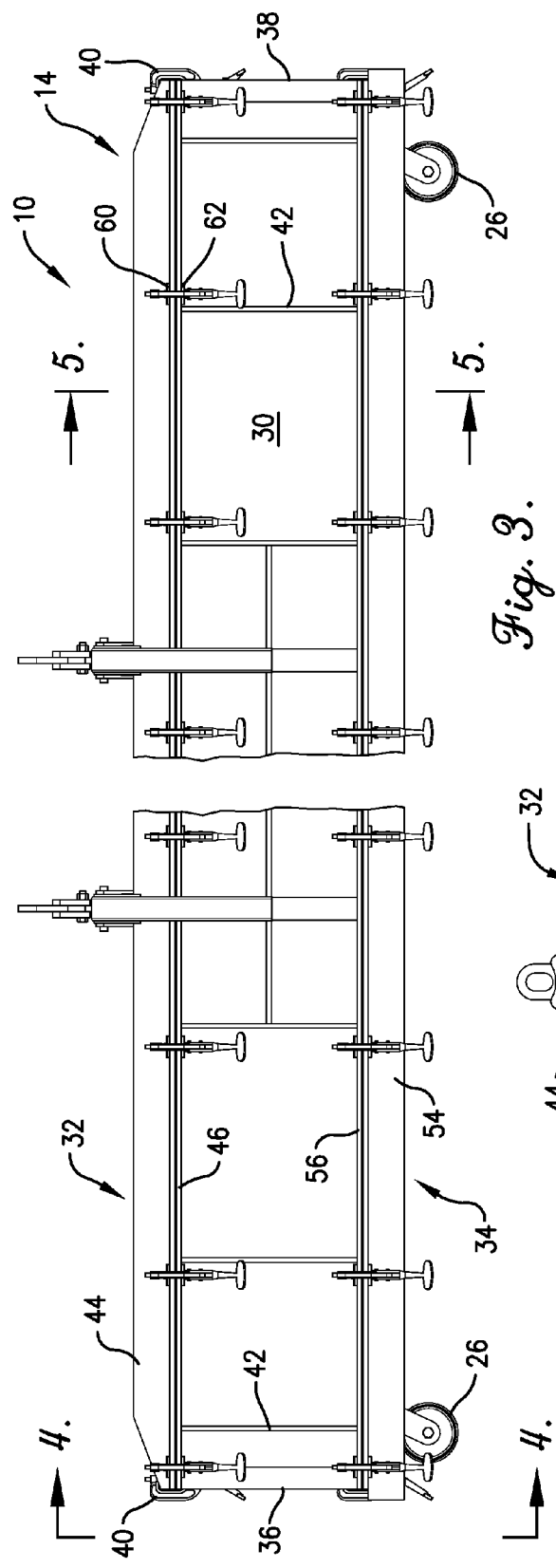
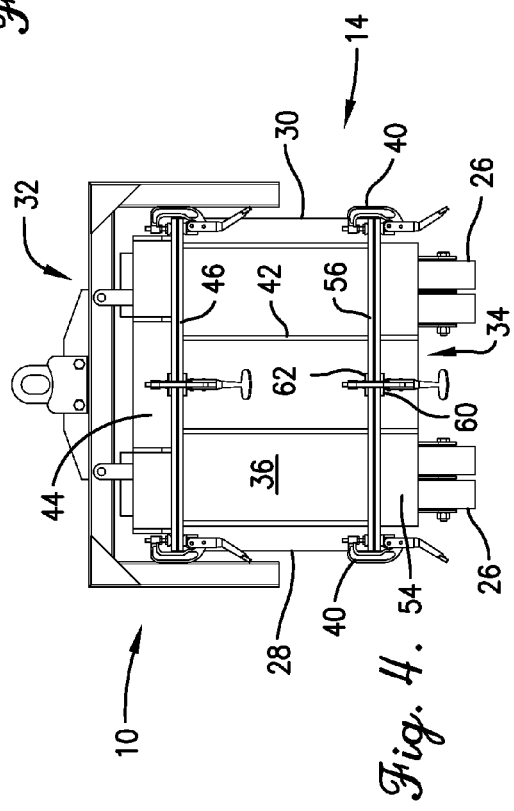

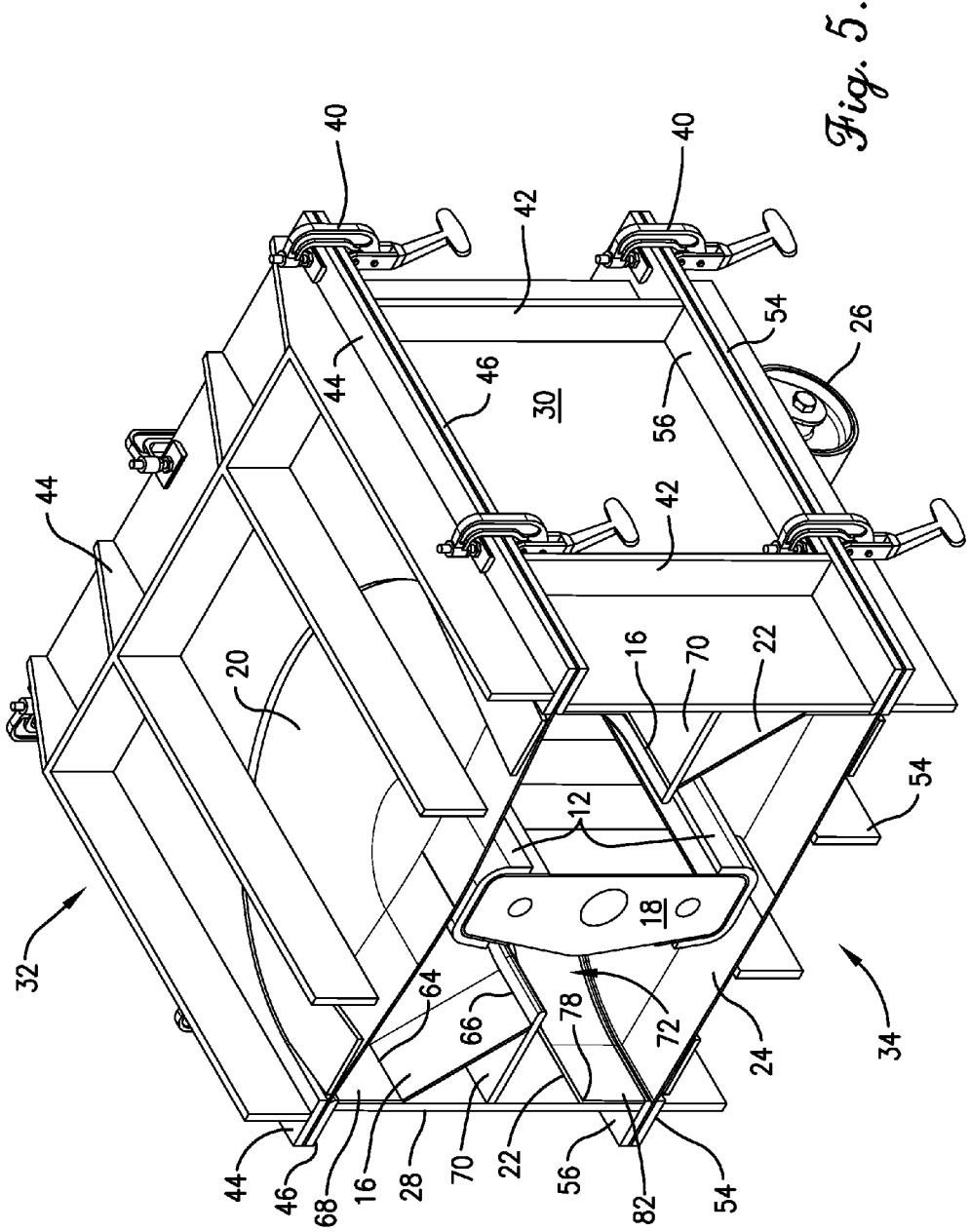

SYSTEM FOR PROCESSING COMPOSITE MATERIALS

BACKGROUND OF THE INVENTION

1. Field of the Invention

Embodiments of the present invention relate to processing composite materials. More particularly, embodiments of the present invention relate to processing composite materials using a chamber with diaphragms positioned on opposing sides of a layup mandrel.

2. Description of the Related Art

Various methods of creating composite parts from fiber-based composite materials may involve placing fibers over or on a forming block which is eventually cured. During placement of the fibers, gases may get trapped in between layers of fibers and gaps or voids may form that typically must be removed to improve the quality of the final part. The composite materials may undergo processing such as forming, shaping, consolidating, compacting, and debulking to remove any gases and voids. Often, a membrane or bag is used to press the materials against the forming block and the combination is cured in an autoclave to achieve optimal compaction. However, very large parts may be too big to fit into an autoclave. Furthermore, parts that include curvatures or corners may have wrinkles in the composite material along the curves and corners. Thus, parts not cured in an autoclave, particularly large parts, may have less than optimal compaction of the composite material in addition to wrinkles in certain areas.

SUMMARY OF THE INVENTION

Embodiments of the present invention solve the above-mentioned problems and provide a distinct advance in the art of processing composite materials. More particularly, embodiments of the invention provide a system capable of processing the composite material of very large parts to achieve near-autoclave compactions while using a conventional oven. Additionally, the system includes an elastomeric diaphragm that is pulled against the composite material under a high vacuum to minimize wrinkles in the material.

Various embodiments of the invention may provide a system for processing a composite material, the system broadly comprising a chamber, a mandrel, an upper ramp, and an upper diaphragm. Some embodiments may also include a lower ramp and a lower diaphragm. The chamber generally provides structural support while a vacuum is applied to the system and may have a six-sided generally rectangular box shape with an upper opening along a top wall and a lower opening along an opposing bottom wall. The mandrel may be located within the chamber and may include a top side and an opposing bottom side such that composite material is placed on the top side and the bottom side.

The upper ramp generally provides a path for the upper diaphragm to follow under vacuum, and may be located adjacent to the top side of the mandrel and tilted at approximately 45 degrees downward thereto. The lower ramp generally provides a path for the lower diaphragm to follow under vacuum, and may be located adjacent to the bottom side of the mandrel and tilted at approximately 45 degrees upward thereto.

The upper diaphragm and the lower diaphragm may both include a sheet of elastomeric material. The upper diaphragm may be placed over the upper opening, while the lower diaphragm may be placed over the lower opening. During processing, a vacuum may be applied to the chamber such that the upper diaphragm is pulled inward through the upper opening and the lower diaphragm is pulled inward through the lower opening. As the vacuum is increased, the upper diaphragm and the lower diaphragm press the composite material against the mandrel. In addition, the upper diaphragm travels along the upper ramp and the lower diaphragm travels along the lower ramp in order to prevent rupture of the two diaphragms when the vacuum is applied.

Other embodiments of the invention may provide a method for processing a composite material. The method may comprise the steps of placing the composite material on a top side of a mandrel and an opposing bottom side of the mandrel, placing the mandrel in a chamber that includes a lower diaphragm placed over a lower opening aligned with the bottom side of the mandrel, sealing the chamber with an upper diaphragm placed over an upper opening aligned with the top side of the mandrel, and applying a vacuum to the interior of the chamber such that the upper diaphragm is pulled inward through the upper opening and the lower diaphragm is pulled inward through the lower opening and the upper diaphragm and the lower diaphragm press the composite material against the mandrel.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 3 is a fragmentary side elevational view of the system with the center portion of the system broken out;

FIG. 4 is an elevational view from one end of the system;

FIG. 5 is a perspective view of a section of the system cut along the vertical plane indicated in FIG. 3;

Figure 1:
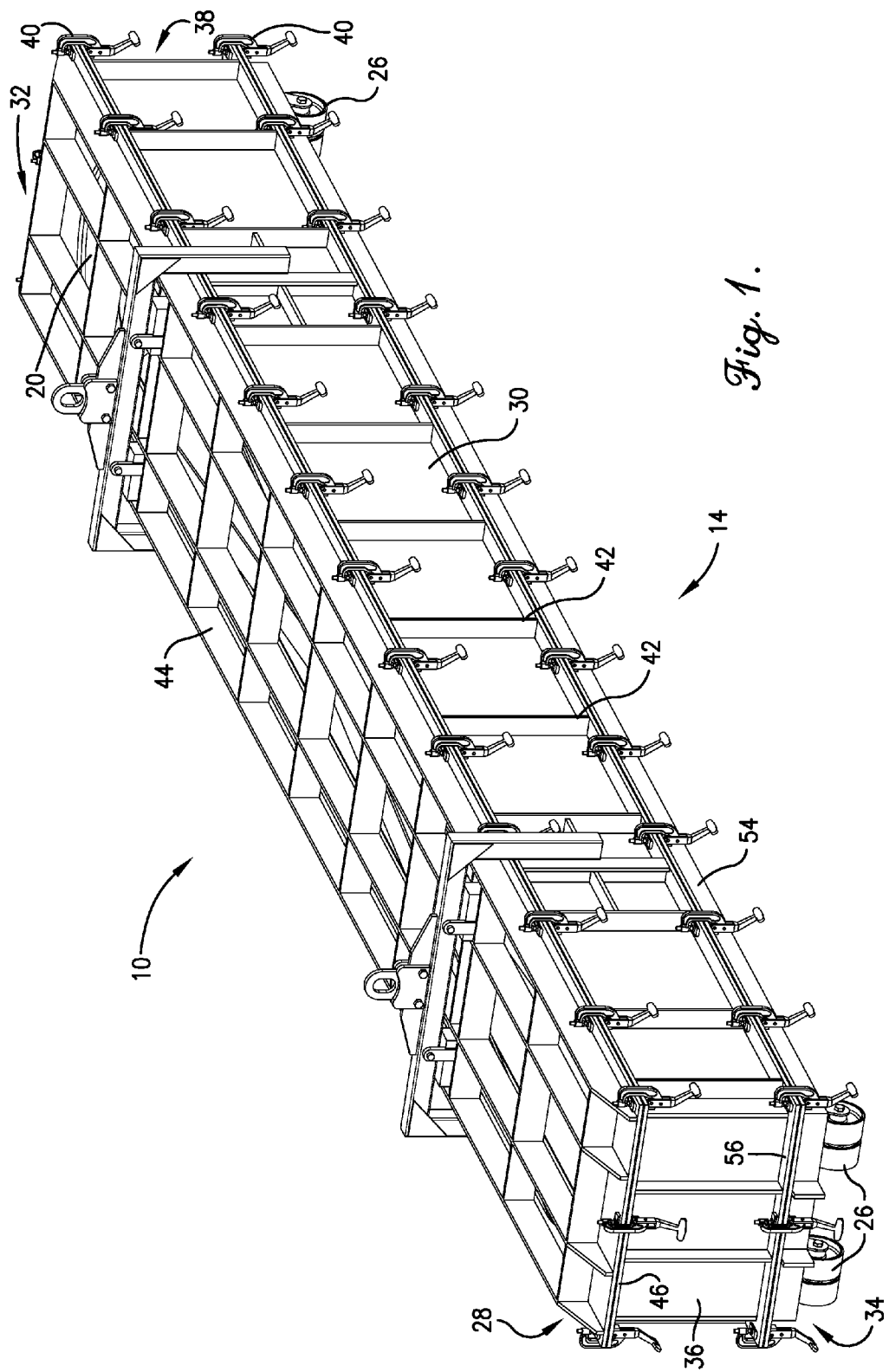
FIG. 1 is a perspective view of a system constructed in accordance with various embodiments of the current invention for processing composite material.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

A system 10 for processing composite material in accordance with various embodiments of the present invention is shown in FIGS. 1-8. The composite material 12, as shown in FIGS. 2 and 5-8, may be processed to create a part by forming, shaping, consolidating, compacting, debulking, curing, and the like, as discussed in greater detail below. Composite material may be known in the art to include at least two constituent components—a reinforcement material and a matrix material. Examples of the reinforcement material that may be used with the current invention include, but are not limited to, fiber materials such as carbon fiber, boron fiber, fiberglass, aramid fiber, ceramic fiber, and the like. In the case of fiber-based reinforcement materials, the fiber may exist in one of at least two forms—either preimpregnated (prepreg), in which the fiber may be coated with a matrix material that is uncured, such as uncured resin, or unenhanced (dry), with no additives to the fiber. The matrix material may include resins, polymers, epoxies, and the like, among others.

The system 10 may broadly comprise a chamber 14, an upper ramp 16, a mandrel 18, and an upper diaphragm 20. Various embodiments of the system 10 may also include a lower ramp 22, a lower diaphragm 24, and a plurality of wheels 26.

The chamber 14, as seen in full in FIGS. 1-4 and in part in FIGS. 5-8, generally provides structural support while a vacuum is applied to the system 10 during processing. The chamber 14 may have a six-sided generally rectangular box shape with a left side wall 28, a right side wall 30, a top wall 32, a bottom wall 34, a (proximal) first end wall 36, a (distal) second end wall 38, a plurality of clamps 40, and a plurality of studs 42. Generally, the chamber 14 may be elongated with a longitudinal axis that is parallel to the left side wall 28, the right side wall 30, the top wall 32, and the bottom wall 34, and transverse to the first end wall 36 and the second end wall 38.

The dimensions and the geometry of the chamber 14 may vary depending on the size and geometry of the part to be created. The length of the chamber 14 may equal the length of the part plus a fixed distance. For example, if the fixed distance is 6 feet (allowing 3 feet of clearance at each end) and the part is 30 feet long, then the chamber 14 may be 36 feet long. The width of the chamber 14 may generally depend on the dimensions of the mandrel 18, as discussed below.

The top wall 32 may include an upper frame 44 and an upper platform 46, which may be separable from one another. The upper frame 44 may include a plurality of crosspieces with spaces therebetween that intersect and are orthogonal to one another to provide structural stability. The upper frame 44 may also include a flat outer portion to align with the upper platform 46. The upper frame 44 may be positioned above the upper platform 46 with the upper diaphragm 20 positioned therebetween, as discussed in more detail below. The upper platform 46 may include a upper opening 48 through which at least a portion of the upper diaphragm 20 may pass during processing. The shape of the upper opening 48 may be roughly oval or elliptical, depending on the geometry of the chamber 14. Typically, the upper opening 48 may align with the left side wall 28 and the right side wall 30, but may be positioned inward and away from the first end wall 36 and the second end wall 38.

The upper platform 46 may further include a first closeout panel 50, located near the first end wall 36, and a second closeout panel 52, located near the second end wall 38. The first closeout panel 50 and the second closeout panel 52 may be removable from the upper platform 46 in order to allow installation or removal of the mandrel 18 from the chamber 14, as described below. The closeout panels 50, 52 may also extend downward into the interior of the chamber 14. In addition, the upper platform 46 may include other openings or cutouts to allow access or monitoring of the interior of the chamber 14.

The bottom wall 34 may include a lower frame 54 and a separable lower platform 56 that are substantially similar to the upper frame 44 and the upper platform 46, respectively. The lower frame 54 may be positioned below the lower platform 56 with the lower diaphragm 24 positioned therebetween, as discussed in more detail below. In addition, the lower platform 56 may include a lower opening 58 that is substantially similar to the upper opening 48. In embodiments of the system 10 that do not include the lower diaphragm 24, the bottom wall 34 may be a solid wall that matches the length and width of the chamber 14 and includes no openings.

Figure 2:
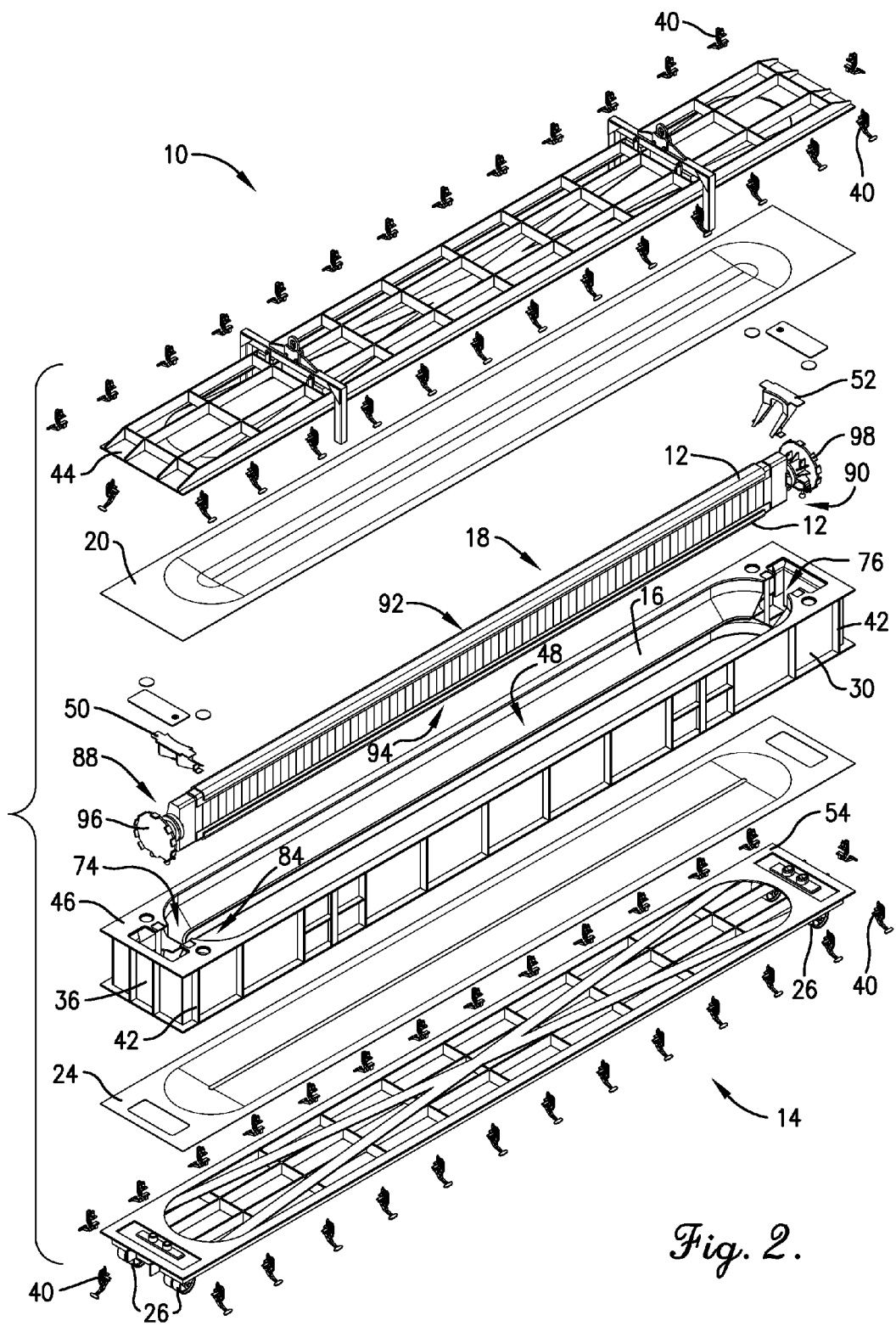
FIG. 2 is an exploded view of the system.

The clamps 40 generally secure the upper frame 44 to the upper platform 46 with the upper diaphragm 20 therebetween and the lower frame 54 to the lower platform 56 with the lower diaphragm 24 therebetween, as seen primarily in FIGS. 5-8. Accordingly, the usage of the clamps 40 allows the upper frame 44 to be easily removed from the upper platform 46 so that the upper diaphragm 20 may be installed, positioned, inspected, replaced, or generally accessed. Likewise with the lower frame 54, the lower diaphragm 24, and the lower platform 56. The clamps 40 may be positioned around the perimeter of the top wall 32 and the bottom wall 34 at spaced apart intervals, as seen in FIGS. 1-2. Clamps as are known in the art, such as C-type clamps, F-type clamps, etc., that are capable of exerting a force of up to approximately 1200 pounds may be utilized for the clamps 40 in the system 10.

Typically, the clamps 40 include a first plate 60 and an opposing second plate 62, wherein the first plate 60 contacts the upper frame 44 and the second plate 62 contacts the upper platform 46 while the upper diaphragm 20 is positioned between the upper frame 44 and the upper platform 46. The first plate 60 and second plate 62 are pressed together with a great force to hold the upper frame 44 and the upper platform 46 against one another in order to prevent any movement or slippage of the upper diaphragm 20 during composite material processing. The clamps 40 are implemented with the lower frame 54, the lower diaphragm 24, and the lower platform 56 in a similar fashion.

The left side wall 28 and the right side wall 30 are substantially similar to each other and may be solid walls that are formed from strengthened material such as steel. The first end wall 36 and the second end wall 38 are substantially similar to each other and may be solid walls that are formed from strengthened material such as steel. The left side wall 28, the right side wall 30, the first end wall 36, and the second end wall 38 may all be vertically standing and positioned between the upper platform 46 and the lower platform 56. Furthermore, the four walls 28, 30, 36, 38 may be positioned towards the interior of the upper platform 46 and the lower platform 56, such that there is some space from the four walls 28, 30, 36, 38 to the outer edges of the upper platform 46 and the lower platform 56.

The first end wall 36 and the second end wall 38 may, either singularly or both, include openings, ports, access points, connections, couplings, or combinations thereof to allow a vacuum to be applied to the interior of the chamber 14. The vacuum may come from a source external to the system 10, wherein the system 10 receives the vacuum from a hose or the like that is coupled to either the first end wall 36, the second end wall 38, or both.

The studs 42 generally provide reinforcement to the left side wall 28, the right side wall 30, the first end wall 36, and the second end wall 38 against the compressive forces in the vertical direction when vacuum is applied to the system 10. The studs 42 may be vertically oriented and spaced apart along the perimeter of the chamber 14, in the space between the outer surface of the four walls 28, 30, 36, 38 and the outer edges of the upper platform 46 and the lower platform 56. The studs 42 may be formed from strengthened material that withstands longitudinal compressive forces without buckling.

The upper ramp 16 generally prevents the upper diaphragm 20 from rupture or other damage during composite material processing by providing a path for the upper diaphragm 20 to follow while vacuum is applied to the system 10. The upper ramp 16 may be positioned on the interior of chamber 14, adjacent to the four walls 28, 30, 36, 38. The upper ramp 16 is generally angled at approximately 45 degrees with respect to a horizontal plane and has a downward slope moving from the four walls 28, 30, 36, 38 toward the interior of the chamber 14, as seen primarily in FIGS. 5-8. The upper ramp 16 is also sloped at an angle of approximately 45 degrees with respect to the direction of travel of the upper diaphragm 20, which is downward while vacuum is applied to the chamber 14. The angle of approximately 45 degrees generally maximizes the elongation of the upper diaphragm 20 without overstretching the upper diaphragm 20 in any one direction.

The upper ramp 16 may include a first edge 64 and an opposing second edge 66. The first edge 64 is generally positioned above the second edge 66 and may couple to a first vertical wall 68, which in turn couples to the upper platform 46 and intersects with the upper opening 48. The second edge 66 may couple with a midplane member 70, which may be parallel to the horizontal and positioned approximately midway along the height of the four walls 28, 30, 36, 38. The midplane member 70 may include a middle opening 72 toward the center of the member 70 which may be oval or generally shaped to accommodate the shape of the mandrel 18 that is positioned therein, as discussed below.

The upper ramp 16 and the first vertical wall 68 may be curved at opposing ends along the first end wall 36 and the second end wall 38. Furthermore, the upper ramp 16 and the first vertical wall 68 may include an upper first end opening 74 in the vicinity of the first end wall 36 and an upper second end opening 76 in the vicinity of the second end wall 38, in which the mandrel 18 may be positioned. A portion of the first closeout panel 50 and the second closeout panel 52 may occupy part of the upper first end opening 74 and the upper second end opening, respectively.

The lower ramp 22 generally serves the same function with respect to the lower diaphragm 24 as the upper ramp 16 serves with respect to the upper diaphragm 20. The lower ramp 22 may be the mirror image of the upper diaphragm 20 and may include a third edge 78 and a fourth edge 80 which are similar to the first edge 64 and the second edge 66, respectively, as seen primarily in FIGS. 5-8. Thus, the third edge 78 may be positioned below the fourth edge 80 as the lower ramp 22 slopes upward when moving from the four walls 28, 30, 36, 38 toward the interior of the chamber 14. In addition, the third edge 78 may couple to a second vertical wall 82, similar to the first vertical wall 68, which in turns couples to the lower platform 56 and intersects with the lower opening 58. The fourth edge 80 may couple with the midplane member 70. Furthermore, the lower ramp 22 may include a lower first end opening 84, similar to the upper first end opening 74, and a lower second end opening 86, similar to the upper second end opening 76.

The mandrel 18 generally supports the composite material 12 to be processed, as seen in FIGS. 2 and 5-8. The mandrel 18 may include a first end 88, a second end 90, a top side 92, and a bottom side 94. Typically, the mandrel 18 is elongated, although the mandrel 18 may also have a shape and dimensions to correspond to the shape and dimensions of the part to be created from the composite material 12. Accordingly, the mandrel 18 may include, among other features, curvatures and contours along the longitudinal axis or may have a cross-sectional shape that is circular, oval, a multisided polygon, or variations thereof. Furthermore, the dimensions of the mandrel 18 may be variable across its length. For example, the mandrel 18 may increase in width or cross-sectional diameter from the first end 88 to the second end 90. In addition, the mandrel 18 may be used to form or debulk a single part placed on either the top side 92 or the bottom side 94; a single part that is continuous along one axis, such as an open-ended box or a tube, that is placed on the top side 92 and the bottom side 94; or two parts simultaneously that are either alike or different, wherein the first part may be placed on the top side 92 and the second part may be placed on the bottom side 94.

In addition to the width of the mandrel 18 depending on the dimensions of the part, the depth of the mandrel 18 may depend on the part as well. The depth of the mandrel 18 may be related to the distance from the top side 92 to the bottom side 94, if the system 10 includes only the upper diaphragm 20. The depth of the mandrel 18 may be related to the distance from the top side 92, or bottom side 94 if the mandrel 18 is cross-sectionally symmetric, to the midplane member 70 for a system 10 with the upper diaphragm 20 and the lower diaphragm 24. The depth may depend on the length of the legs or flanges of the part, which may be best seen as the vertical portions of the composite material 12 in FIGS. 6 and 8, wherein the depth may be equal to the length of the flanges plus a fixed distance, such as four inches to six inches.

The depth of the mandrel 18 may also determine the width of the chamber 14, wherein the width of the chamber 14 may be determined using the 4:5 rule, which states that for every 4 units of depth of the mandrel 18, the sides of the chamber 14 must be approximately 5 units away. Alternatively, by dividing both numbers by 4, the rule could be expressed as 1:1.25. Thus, by applying the rule to determine the clearance on both sides of the part, the width of the chamber 14, $W_c$, approximately equals the width of the part, $W_p$, plus 1.25 times the depth of the mandrel 18, $D_M$, on each side, or $W_c \approx W_p + 2.5 \times D_M$. For example, if the width of the part, $W_p$, is 6 feet and the depth, $D_M$, of the mandrel 18 is 1 foot, then the width of the chamber 14, $W_c \approx 6$ feet+$2.5 \times 1$ foot=8.5 feet.

The mandrel 18 may be positioned in the interior of the chamber 14 with the longitudinal axis of the mandrel 18 being aligned with the longitudinal axis of the chamber 14. The first end 88 of the mandrel 18 may be positioned in the upper first end opening 74 and the lower first end opening 84. The second end 90 of the mandrel 18 may be positioned in the upper second end opening 76 and the lower second end opening 86. Accordingly, the top side 92 of the mandrel 18 may be aligned with the top wall 32, and the bottom side 94 of the mandrel 18 may be aligned with the bottom wall 34.

In various embodiments, the mandrel 18 may be removable from the chamber 14 to be utilized in a fiber placement machine, or similar apparatus, external to the system 10. The mandrel 18 may be positioned in the external apparatus to have the composite material 12, which may include fiber-based material, placed or formed on the top side 92, the bottom side 94, or both. Afterwards, the mandrel 18 may be returned to the system 10 for further processing of the composite material 12. In such embodiments, the mandrel 18 may include a first spindle adapter 96 coupled to the first end 88 and a second spindle adapter 98 coupled to the second end 90. The spindle adapters 96, 98 may act as attachment interfaces for the mandrel 18 to be used in the external apparatus.

In additional embodiments, the mandrel 18 may include an internal heat source to provide curing for the composite material 12. The heat source may include coils, tubes, or other elements contained within the mandrel 18 that generate thermal energy.

The upper diaphragm 20 generally provides compaction of the composite material 12 placed on the mandrel 18. The compaction force may be delivered to the composite material 12 by stretching the upper diaphragm 20 with a vacuum applied to the chamber 14 such that the diaphragm 20 contacts the composite material 12 and presses it downward against the mandrel 18. The upper diaphragm 20 may include a sheet of elastomeric material of generally the same dimensions, when unstretched, as the top wall 32 of the chamber 14, as seen in FIGS. 2-5.

An exemplary elastic material may include certain types of rubber with the following properties: a relatively high durometer ranging from approximately 60 to approximately 65, a moderate elongation with a minimum of approximately 300%, a high modulus of approximately 700 pounds per square inch (psi) at approximately 300% elongation, and a low compression of a maximum of approximately 18%. The upper diaphragm 20 typically has a uniform thickness ranging from approximately 0.125 inches to approximately 0.18 inches, although certain parts may require a varying thickness.

As stated above, the upper diaphragm 20 may be held tightly between the upper frame 44 and the upper platform 46. The upper diaphragm 20 may also rest upon the upper opening 48 of the platform 46 through which the diaphragm 20 may be pulled when a vacuum is applied to the chamber 14.

The lower diaphragm 24 generally is substantially similar to the upper diaphragm 20 with regard to properties and dimensions. In certain embodiments where a different part is processed on the top side 92 of the mandrel 18 than the bottom side 94, then the lower diaphragm 24 may possess differences corresponding to the differences in the parts. The lower diaphragm 24 may be held tightly between the lower frame 54 and the lower platform 56. The lower diaphragm 24 may also contact the lower opening 58 of the platform 56 through which the diaphragm 24 may be pulled when a vacuum is applied to the chamber 14.

The wheels 26 generally allow the system 10 to be transported during various stages of processing. For example, the system 10 may reside in one location while the composite material 12 is placed or formed on the mandrel 18, or while vacuum is applied to the system 10 to compact or debulk the composite material 12. The system 10 may then be moved, typically with the vacuum still applied, to an oven (or other heat source) to cure the composite material 12 while it is compacted. The wheels 26 may include one or more wheels able to pivot about a vertical axis near each of the four corners of the lower side of the bottom wall 34.

The system 10 may operate as follows. The upper frame 44, the upper diaphragm 20, and the clamps 40 used with the upper frame 44 may be removed from the chamber 14. In certain embodiments, the mandrel 18, the first closeout panel 50, and the second closeout panel 52 may also be removed from the chamber 14 in order to have composite material 12 placed on the top side 92 or both the top side 92 and the bottom side 94. The placement may be performed by an external apparatus or with manual approaches. The mandrel 18, including the composite material 12, may then be repositioned into the chamber 14, and the first closeout panel 50 and the second closeout panel 52 may be replaced. In other embodiments, the mandrel 18 may remain in the chamber 14 and composite material 12 may be placed upon the top side 92 in situ either automatically or manually. The system 10 may be shown after the composite material 12 has been placed in FIGS. 2 and 5-8.

Figure 6:
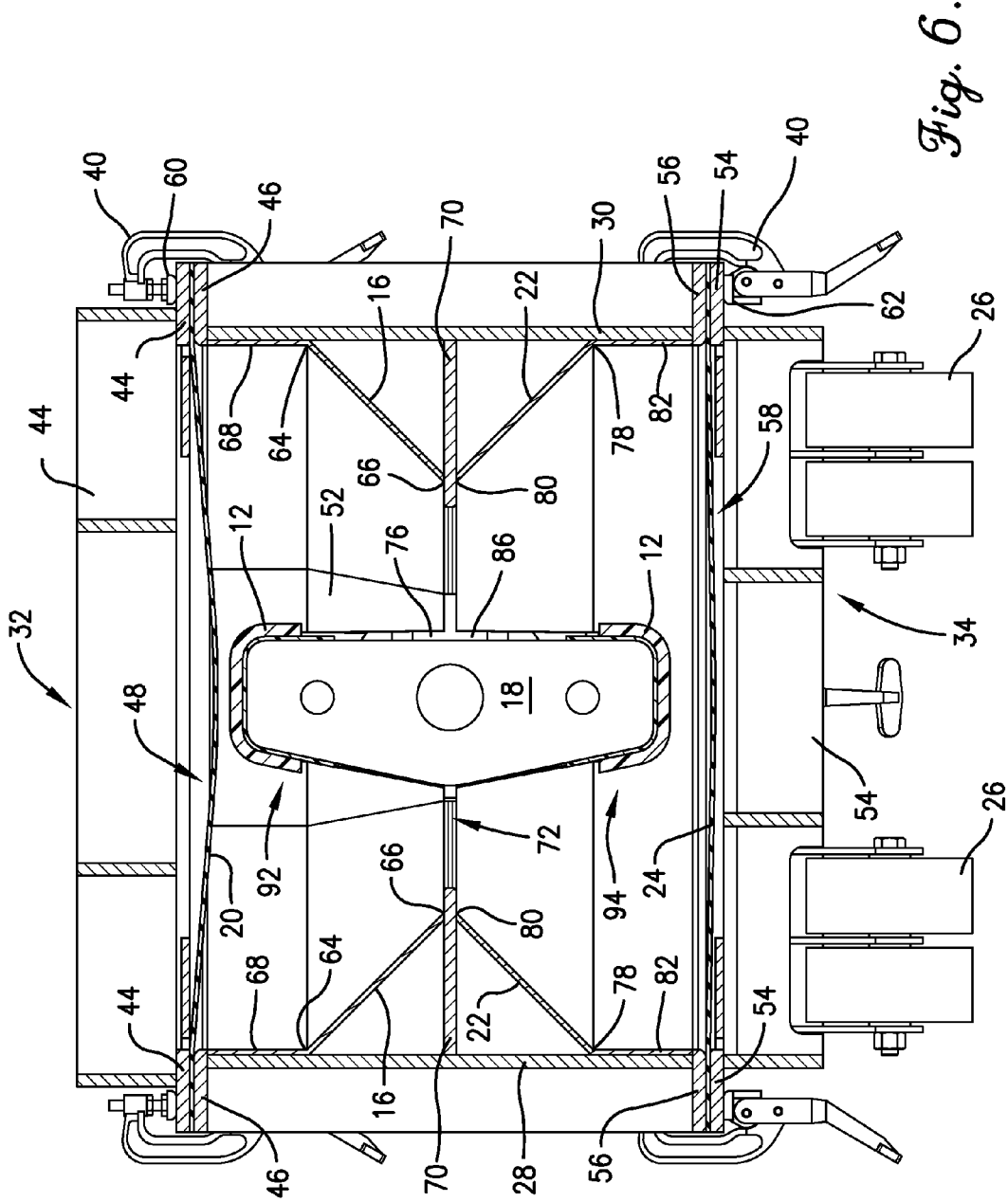
FIG. 6 is an elevational view of the section of the system from FIG. 5.

With the composite material 12 placed on the mandrel 18 either externally or in situ, the upper diaphragm 20 may be placed upon the upper platform 46 and pulled fairly taut so that the upper diaphragm 20 is generally flat and smooth, as seen in FIGS. 5-6, to minimize wrinkles in the diaphragm 20 during processing. There may be approximately 1 inch of clearance between the upper diaphragm 20 and the composite material 12 on the mandrel 18. The upper frame 44 may be placed over the upper diaphragm 20 and the clamps 40 may be applied to the edges of the top wall 32 in order to strongly press the upper frame 44 against the upper platform 46, with the upper diaphragm 20 positioned therebetween. As a result, the upper diaphragm 20 may be securely held in place without slipping during composite material processing.

Figure 7:
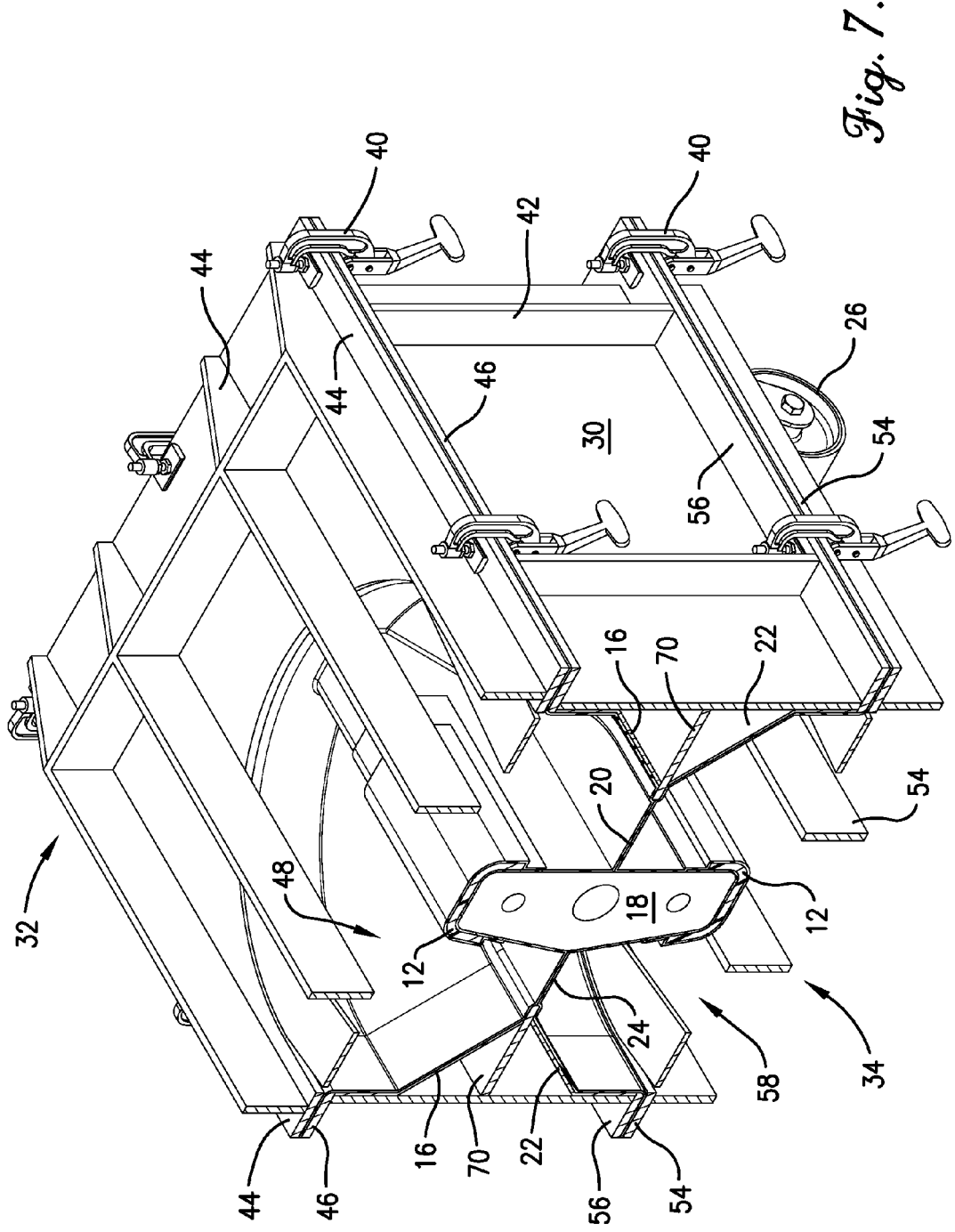
FIG. 7 is a perspective view of the system similar to the view of FIG. 5, wherein a vacuum has been applied to the system 10, pulling an upper diaphragm and a lower diaphragm inward such that they contact one another.
Figure 8:
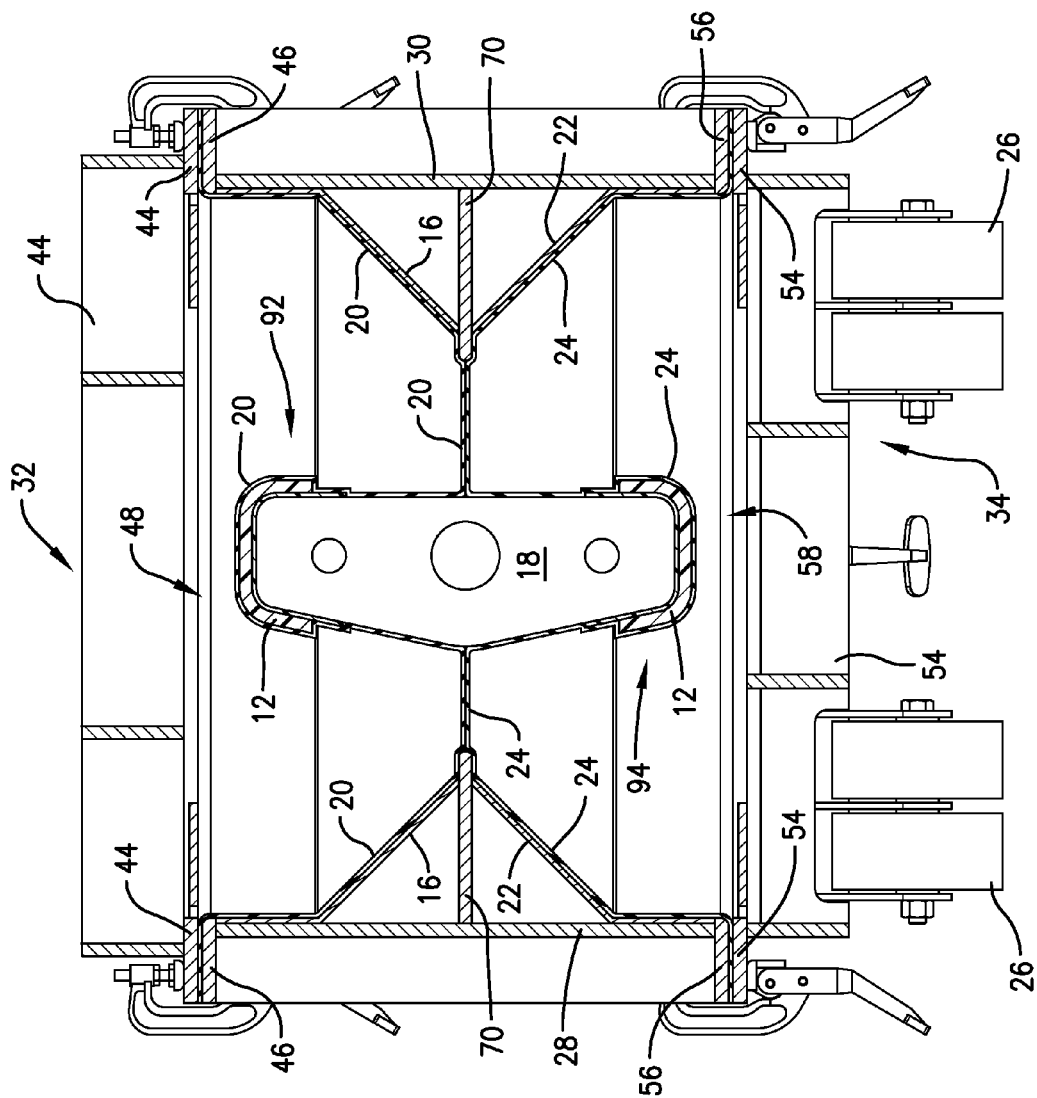
FIG. 8 is an elevational view of the section of FIG. 7, with a vacuum applied to the system.

Once the upper diaphragm 20 is held in place, the chamber 14 should be sealed and virtually airtight. A vacuum may be applied to the chamber 14 from an external source. Depressurizing the interior of the chamber 14 while the exterior remains at roughly atmospheric pressure may cause the upper diaphragm 20 and the lower diaphragm 24 to be pulled inward toward the mandrel 18 and the composite material 12 placed thereon. In various embodiments, the diaphragms 20, 24 may be drawn inward at a vacuum of approximately 15 inches of mercury (in Hg). As the vacuum increases, the diaphragms 20, 24 may continue to stretch and be pulled inward such that they contact the composite material 12 and then start to drape along the sides of the mandrel 18. In addition, the upper diaphragm 20 and the lower diaphragm 24 may drape along the upper ramp 16 and the lower ramp 22, respectively. Further increase of the vacuum may cause the upper diaphragm 20 to touch the lower diaphragm 24 along the sides of the mandrel 18 in the vicinity of the midplane member 70, as seen in FIGS. 7-8. At this point, maximum vacuum for the chamber 14 may be reached and maximum compaction of the composite material 12 may be achieved. In various embodiments, the maximum vacuum may be greater than approximately 25 in Hg. When maximum vacuum is reached, if curing of the composite material 12 is necessary, then the system 10 may be transported to a heat source, or optionally, the internal heat source of the mandrel 18 may be activated. In other embodiments, the mandrel 18 with the composite material 12 in place may be removed from the chamber 14, vacuum sealed, and transported to an autoclave for curing. When used as described herein, an upper diaphragm 20 or a lower diaphragm 24 that possesses the exemplary material properties described above may be used approximately 50 times before requiring replacement.

Figure 9:
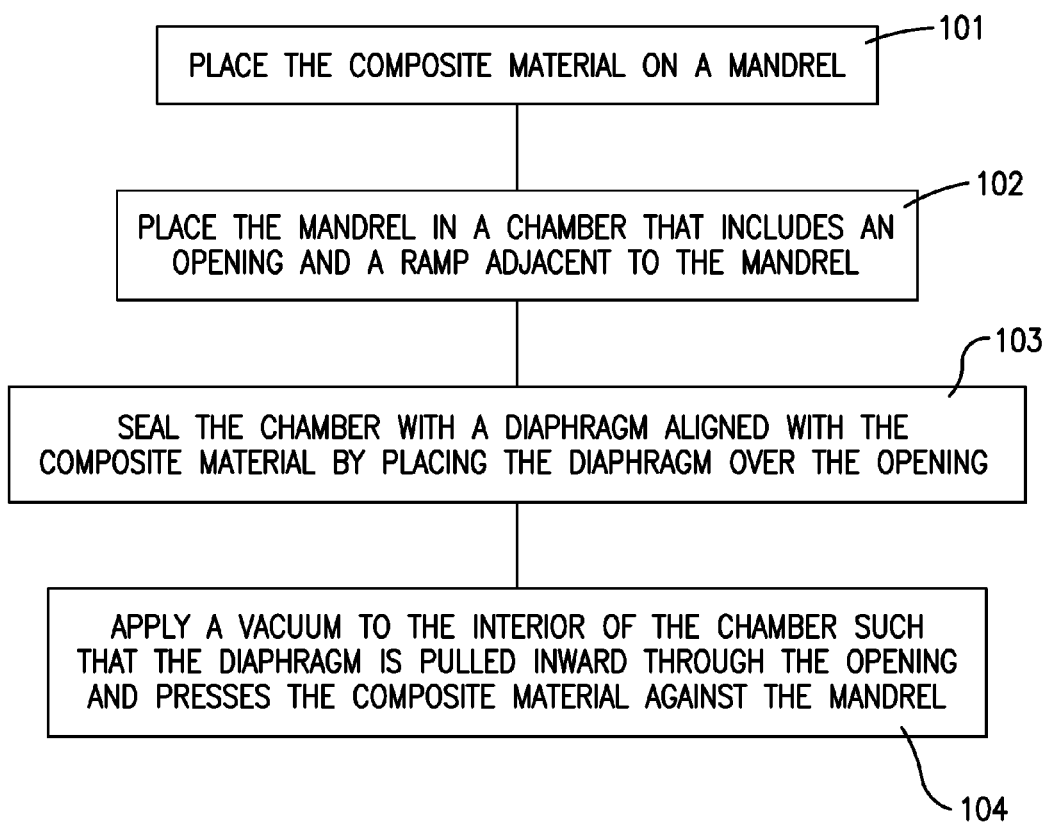
FIG. 9 is a flow diagram of at least a portion of the steps of a first method for processing composite material.

Some of the steps of a first method 100 for processing a composite material using a system 10 in accordance with various embodiments of the present invention are shown in FIG. 9. The steps may be performed in the order as shown in FIG. 9, or they may be performed in a different order. Furthermore, some steps may be performed concurrently as opposed to sequentially.

The composite material 12 is first placed on a mandrel 18, as seen in FIGS. 2 and 5-8 and depicted in step 101. At least a portion of the mandrel 18 may be shaped to correspond to the shape of a part to be processed. The placement may be performed automatically by an external apparatus or using manual techniques.

The mandrel 18 is placed in a chamber 14 that includes a ramp 16 adjacent to the mandrel 18 as depicted in step 102. The chamber 14 may have a six-sided rectangular box shape wherein one side may include an opening 48. The mandrel 18 may be placed in the chamber 14 such that the composite material 12 is adjacent to the opening 48. The ramp 16 may be positioned within the chamber 14 adjacent to the mandrel 18 on all sides, such that the ramp 16 surrounds the mandrel 18. The ramp 16 may also be sloped downward toward the mandrel 18 at an angle of approximately 45 degrees. In various embodiments, the mandrel 18 may be originally positioned in the chamber 14 during step 101, without the need for step 102.

The chamber 14 is sealed with a diaphragm 20 that is aligned with the composite material 12 as depicted in step 103. The diaphragm 20 may be formed from elastomeric material and may be placed roughly flat over the opening 48 and firmly secured in that position.

A vacuum may be applied to the chamber 14 such that the diaphragm 20 is pulled inward through the opening 48 and presses the composite material 12 against the mandrel 18, as seen in FIGS. 7-8 and depicted in step 104. Applying a vacuum to the chamber 14 may pull the diaphragm 20 inward to the interior of the chamber 14. Increasing the vacuum may cause the diaphragm 20 to press the composite material 12 against the mandrel 18 in order to shape, compact, or debulk the composite material 12. In addition, a portion of the diaphragm 20 may travel along the ramp 16 in order to avoid rupture as the vacuum increases. After the vacuum reaches a maximum, the system 10 may be exposed to a heat source to cure the composite material 12.

Figure 10:
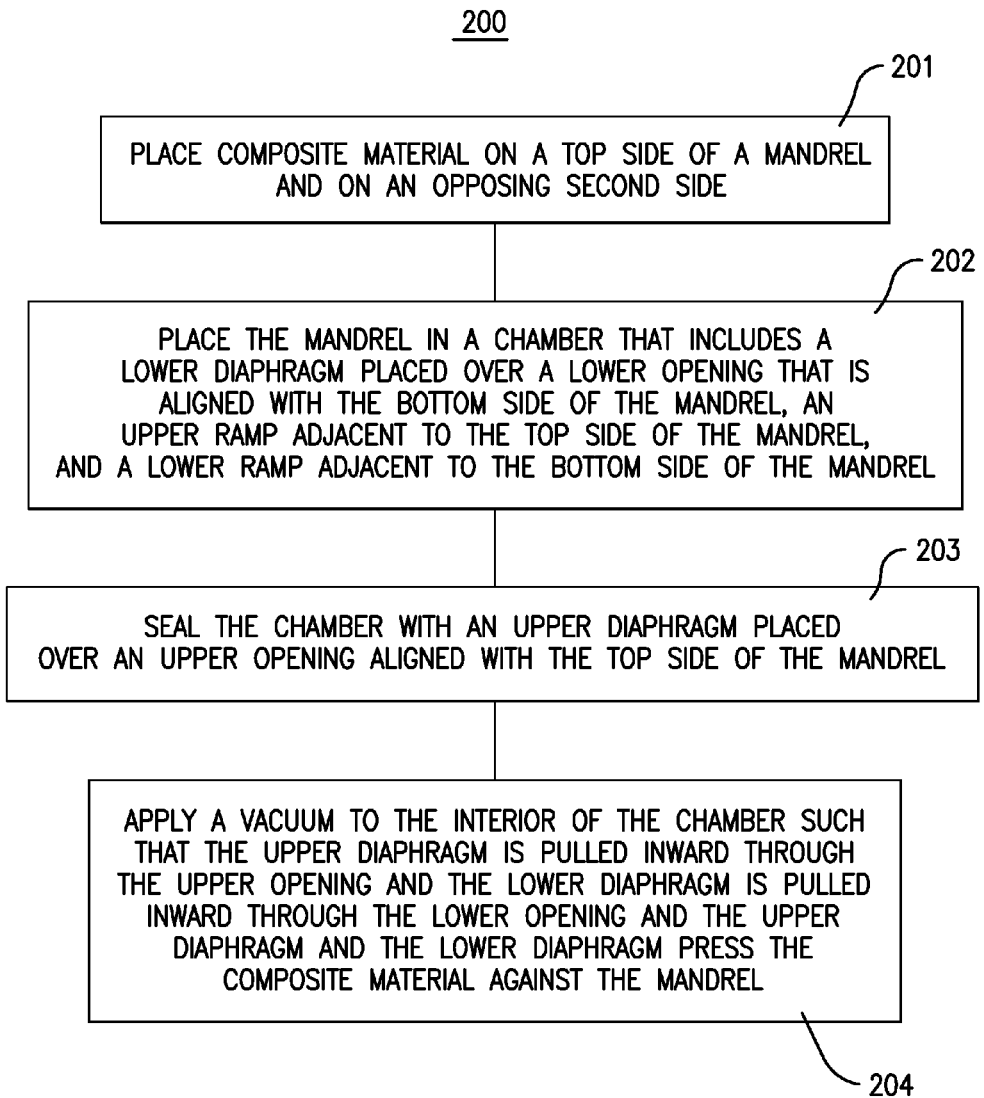
FIG. 10 is a flow diagram of at least a portion of the steps of a second method for processing composite material.

Some of the steps of a second method 200 for processing a composite material using a system 10 in accordance with various embodiments of the present invention are shown in FIG. 10. The steps may be performed in the order as shown in FIG. 10, or they may be performed in a different order. Furthermore, some steps may be performed concurrently as opposed to sequentially.

Composite material 12 is placed on a top side 92 of a mandrel 18 and on an opposing bottom side 94 of the mandrel 18, as seen in FIGS. 2 and 5-8 and depicted in step 201. The bottom side 94 and the top side 92 may be shaped to correspond to the shape of a part created from the composite material 12, or to the shapes of first and second parts, respectively, to be created. The placement may be performed automatically by an external apparatus or using manual techniques.

The mandrel 18 is placed in a chamber 14 that includes a lower diaphragm 24 placed over a lower opening 58 that is aligned with the bottom side 94 of the mandrel 18, a lower ramp 22 adjacent to the bottom side 94, and an upper ramp 16 adjacent to the top side 92 of the mandrel 18, as depicted in step 202. The chamber 14 may have a six-sided rectangular box shape with a top wall 32 and an opposing bottom wall 34. The lower diaphragm 24 may be formed from elastomeric material. The lower opening 58 may be located along the bottom wall 34. The lower ramp 22 and the upper ramp 16 may be positioned within the chamber 14 adjacent to the mandrel 18 on all sides, such that the lower ramp 22 and the upper ramp 16 surround the mandrel 18. The upper ramp 16 may be sloped downward toward the mandrel 18 at an angle of approximately 45 degrees. The lower ramp 22 may be sloped upward toward the mandrel 18 at an angle of approximately 45 degrees.

The chamber 14 is sealed with an upper diaphragm 20 placed over an upper opening 48 that is aligned with the top side 92 of the mandrel 18 and the composite material 12 thereon, as depicted in step 203. The upper diaphragm 20 may be formed from elastomeric material, and the upper opening 48 may be located along the top wall 32. The upper diaphragm 20 may be placed roughly flat over the upper opening 48 and firmly secured in that position.

A vacuum may be applied to the chamber 14 such that the upper diaphragm 20 is pulled inward through the upper opening 48 and the lower diaphragm 24 is pulled inward through the lower opening 58 and the upper diaphragm 20 and the lower diaphragm 24 press the composite material 12 against the mandrel 18, as seen in FIGS. 7-8 and depicted in step 204. Increasing the vacuum may cause the two diaphragms 20, 24 to form, shape, compact, or debulk the composite material 12. The two diaphragms 20, 24 may also contact each other along the sides of the mandrel 18 near the center of the chamber 14. In addition, a portion of the lower diaphragm 24 may travel along the lower ramp 22 in order to avoid rupture as the vacuum increases. Likewise, a portion of the upper diaphragm 20 may travel along the lower ramp 22. After the vacuum reaches a maximum, the system 10 may be exposed to a heat source to cure the composite material 12.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters patent includes the following:

1. A system for processing a composite material for a part, the system comprising:
    a mandrel configured to support the composite material;
    a chamber configured to retain opposing ends of the mandrel and provide structural support when a vacuum is applied to the system, the chamber including a first opening along a top wall;
    a first diaphragm including a portion clamped to the top wall, the first diaphragm covering the first opening and configured to be pulled from the first opening when the vacuum is applied;
    a first ramp located within the chamber adjacent to the mandrel and tilted at approximately 45 degrees downward thereto, wherein a portion of the first diaphragm travels along the first ramp to prevent rupture of the first diaphragm when the vacuum is applied; and
    a first wall, vertically oriented and coupled to a distal end of the first ramp away from the mandrel and further coupled to the top wall such that the first ramp is spaced apart from the point at which the first diaphragm is clamped to the top wall.

2. The system of claim 1, wherein the first ramp and the first wall include an oval-shaped curvature proximal to opposing ends of the mandrel.

3. The system of claim 1, wherein the chamber further includes a lower opening along a bottom wall, and the system further includes:
    a second diaphragm including a portion clamped to the bottom wall, the second diaphragm covering the second opening and configured to be pulled from the second opening when the vacuum is applied;

a second ramp located within the chamber adjacent to the mandrel and tilted at approximately 45 degrees upward thereto, wherein a portion of the second diaphragm travels along the second ramp to prevent rupture of the second diaphragm when the vacuum is applied; and a second wall, vertically oriented and coupled to a distal end of the second ramp away from the mandrel and further coupled to the bottom wall such that the second ramp is spaced apart from the point at which the second diaphragm is clamped to the bottom wall.

4. The system of claim 3, wherein the second ramp and the second wall include an oval-shaped curvature proximal to opposing ends of the mandrel.

5. The system of claim 1, wherein the mandrel is removable from the chamber.

6. A system for processing a composite material for a part, the system comprising:

a mandrel configured to support the composite material;

a chamber configured to retain opposing ends of the mandrel and provide structural support when a vacuum is applied to the system, the chamber including a first opening along a top wall;

a first diaphragm including a portion clamped to the top wall, the first diaphragm covering the first opening and configured to be pulled from the first opening when the vacuum is applied;

a first wall, vertically oriented and coupled to the top wall, the first wall including a lower edge;

a first midplane member, horizontally oriented and positioned below the lower edge of the first wall; and a first surface extending from the lower edge of the first wall to the first midplane member at an angle between the vertical and the horizontal, wherein a portion of the first diaphragm contacts the first surface to prevent rupture of the first diaphragm when the vacuum is applied.

7. The system of claim 6, further comprising:

a second wall, vertically oriented and coupled to the top wall on the opposing side of the mandrel from the first wall, the second wall including a lower edge;

a second midplane member, horizontally oriented and positioned below the lower edge of the second wall; and a second surface extending from the lower edge of the second wall to the second midplane member at an angle between the vertical and the horizontal, wherein a portion of the first diaphragm contacts the second surface to prevent rupture of the first diaphragm when the vacuum is applied.

8. The system of claim 1, wherein the first diaphragm is constructed from elastic material with a durometer ranging from approximately 60 to approximately 65.

9. The system of claim 1, wherein the first diaphragm is constructed from elastic material with an elongation with a minimum of 300%.

10. The system of claim 1, wherein the first diaphragm is constructed from elastic material with a modulus of approximately 700 pounds per square inch (psi) at approximately 300% elongation.

11. The system of claim 1, wherein the first diaphragm is constructed from elastic material with a compression of a maximum of 18%.

12. The system of claim 1, wherein the first diaphragm is constructed from elastic material with a ratio of modulus in pounds per square inch (psi) to thickness in inches ranging from approximately 3889:1 to approximately 5600:1.

13. The system of claim 6, wherein the first diaphragm is constructed from elastic material with a durometer ranging from approximately 60 to approximately 65.

14. The system of claim 6, wherein the first diaphragm is constructed from elastic material with an elongation with a minimum of 300%.

15. The system of claim 6, wherein the first diaphragm is constructed from elastic material with a modulus of approximately 700 pounds per square inch (psi) at approximately 300% elongation.

16. The system of claim 6, wherein the first diaphragm is constructed from elastic material with a compression of a maximum of 18%.

17. The system of claim 6, wherein the first diaphragm is constructed from elastic material with a ratio of modulus in pounds per square inch (psi) to thickness in inches ranging from approximately 3889:1 to approximately 5600:1.

* * * * *